(12) United States Patent
Chuang et al.

(10) Patent No.: US 8,982,815 B2
(45) Date of Patent: Mar. 17, 2015

(54) APPARATUSES AND METHODS FOR IPV6 ADDRESS ACQUISITION

(75) Inventors: Po-Ying Chuang, Taipei (TW);
Yuan-Chieh Lin, Taichung (TW)

(73) Assignee: Mediatek Inc., Hsin-Chu (TW)

( * ) Notice: Subject to any disclaimer, the term of this patent is extended or adjusted under 35 U.S.C. 154(b) by 113 days.

(21) Appl. No.: 13/454,966

(22) Filed: Apr. 24, 2012

(65) Prior Publication Data

US 2013/0279402 A1    Oct. 24, 2013

(51) Int. Cl.
*H04W 4/00* (2009.01)
*H04W 76/02* (2009.01)
*H04L 29/12* (2006.01)
*H04W 80/04* (2009.01)

(52) U.S. Cl.
CPC ......... *H04W 76/022* (2013.01); *H04L 61/2007* (2013.01); *H04L 61/6059* (2013.01); *H04W 80/045* (2013.01)
USPC ..................................... 370/329; 370/395.52

(58) Field of Classification Search
None
See application file for complete search history.

(56) References Cited

U.S. PATENT DOCUMENTS

| | | | |
|---|---|---|---|
| 7,873,003 B2* | 1/2011 | Baek et al. .................... 370/329 |
| 8,549,117 B2* | 10/2013 | Vogt .............................. 709/222 |
| 2001/0017856 A1* | 8/2001 | Asokan et al. ................ 370/389 |
| 2005/0271034 A1* | 12/2005 | Asokan et al. ................ 370/349 |
| 2007/0025329 A1* | 2/2007 | Chen ............................. 370/352 |
| 2008/0107067 A1* | 5/2008 | Baek et al. .................... 370/328 |
| 2010/0172324 A1* | 7/2010 | Chen ............................. 370/331 |
| 2010/0254334 A1* | 10/2010 | Lin et al. ....................... 370/329 |
| 2011/0134757 A1* | 6/2011 | Lin et al. ....................... 370/241 |
| 2012/0202491 A1* | 8/2012 | Fox et al. .................. 455/435.1 |
| 2012/0246325 A1* | 9/2012 | Pancorbo Marcos et al. 709/227 |

* cited by examiner

*Primary Examiner* — Donald Mills
(74) *Attorney, Agent, or Firm* — McClure, Qualey & Rodack, LLP

(57) ABSTRACT

A mobile communication device operating as a Mobile Terminal (MT) with multiple processor logics is provided. In the mobile communication device, a first processor logic is configured for sending an Activate PDP (Packet Data Protocol) Context Request message to a service network, a second processor logic is configured for receiving an Activate PDP Context Accept message indicating a PDP address from the service network, and a third processor logic is configured for indicating an interface identifier and a prefix obtained from the PDP address to a Terminal Equipment (TE), so that the TE constructs an IPv6 address based on the prefix and interface identifier.

20 Claims, 7 Drawing Sheets

APPARATUSES AND METHODS FOR IPV6 ADDRESS ACQUISITION

BACKGROUND OF THE INVENTION

1. Field of the Invention

The invention generally relates to the acquisition of IPv6 addresses, and more particularly, to the acquisition of IPv6 addresses in mobile communication devices.

2. Description of the Related Art

With the explosive growth of Internet applications, more and more devices, such as personal computers, workstations, laptop computers, smart phones, and various electric appliances, require IP addresses to communicate on the Internet. It leads to a problem that the number of the commonly adopted IP addresses provided by the Internet Protocol version 4 (IPv4) is going to be used up. In order to accommodate the fast growing needs for IP addresses, the Internet Protocol version 6 (IPv6) has been proposed by the Internet Engineering Task Force (IETF) to solve the long-anticipated problem of IPv4 address exhaustion, and provide a sufficient address space, simplified header format, support for authentication and privacy, auto-configuration of address assignments, and new Quality-of-Service (QoS) capabilities. The IPv4 uses 32 bits for an IP address and therefore has $2^{32}$ possible addresses, while the IPv6 uses 128 bits for an addresses and results in $2^{128}$ possible addresses (approximately 340 undecillion or 3.4×1038). This expansion can accommodate much more devices and users on the Internet and offer extra flexibility in allocating addresses and efficiency in routing traffic. It also relieves the need on Network Address Translation (NAT), which is widespread deployed as a work around for the IPv4 address exhaustion problem. An IPv6 address is typically composed of two parts: a 64-bit network prefix (referred to herein as prefix for brevity) used for routing, and a 64-bit interface identifier used to identify a host's network interface. In general, the prefix is contained in the most significant 64 bits of the IPv6 address. The interface identifier is generated from the interface's MAC address using the modified EUI-64 format, obtained from a DHCPv6 server of GGSN, established randomly, or just assigned manually. Particularly, a dynamic IPv6 address is configured using the stateless address auto-configuration (SLAAC).

FIG. 1 is a message sequence chart illustrating a stateless address auto-configuration of an IPv6 address in a mobile communication system. In the mobile communication system, a Mobile Terminal (MT) 20 provides wireless communications with a service network for a connected Terminal Equipment (TE) 10, wherein the service network comprises a Serving GPRS (General Packet Radio Services) Support Node (SGSN) 30 for packet routing and transfer and a Gateway GPRS Support Node (GGSN) 40 for packet routing and transfer and Packet Data Protocol (PDP) addresses assignments. As shown in FIG. 1, the TE 10 initiates an IPv6 interface-identifier negotiation by sending a request for PDP context activation to the MT 20 when it requires an IPv6 address for packet transceiving within the Packet-Switched (PS) domain of the service network and for packet transceiving on the Intranet or Internet Service Provider (ISP) (step S110). In response to the received request from the TE 10, the MT 20 sends an Activate PDP Context Request message to the SGSN 30 (step S120). Specifically, the Activate PDP Context Request message may contain various parameters, such as the information concerning the requested Access Point Name (APN), PDP type, and Protocol Configuration Options (PCO). When receiving the Activate PDP Context Request message, the SGSN 30 further sends a Create PDP Context Request message to the GGSN 40 (step S130). Subsequently, the GGSN 40 replies to the SGSN 30 with a Create PDP Context Response message which indicates an assigned PDP address (step S140). The SGSN 30 forwards the PDP address to the MT 20 by sending an Activate PDP Context Accept message to the MT 20 (step S150). When receiving the Activate PDP Context Accept message, the MT 20 extracts an interface identifier from the PDP address and then indicates the interface identifier to the TE 10 via a response for PDP context activation (step S160). With the interface identifier, the TE 10 constructs a link-local address and then executes a router discovery process by sending a Router Solicitation (RS) message to the GGSN 40 (step S170). In reply, the GGSN 40 sends a Router Advertisement (RA) message indicating a prefix to the TE 10 (step S180). After that, an IPv6 address may be constructed according to the prefix and the interface identifier, and the procedure ends. However, under some circumstances, the GGSN 40 may delay the reply of the RA message to the TE 10 or may not reply at all, when receiving the RS message from the TE 10. As a result, the TE 10 may not obtain the required IPv6 address in time, and accordingly the user may experience a serious delay when establishing data network connectivity or even cannot access the data network.

BRIEF SUMMARY OF THE INVENTION

In order to solve the above-mentioned problem, the invention proposes a flexible way to speed up the acquisition of an IPv6 address. In one aspect of the invention, a mobile communication device operating as a Mobile Terminal (MT) is provided. The mobile communication device comprises a first processor logic for sending an Activate PDP (Packet Data Protocol) Context Request message to a service network, a second processor logic for receiving an Activate PDP Context Accept message indicating a PDP address from the service network, and a third processor logic for indicating an interface identifier and a prefix obtained from the PDP address to a Terminal Equipment (TE), so that the TE constructs an IPv6 address based on the prefix and interface identifier.

In another aspect of the invention, a method for IPv6 address acquisition by a mobile communication device operating as an MT is provided. The method comprises the steps of sending an Activate PDP Context Request message to a service network, receiving an Activate PDP Context Accept message indicating a PDP address from the service network, and indicating an interface identifier and a prefix obtained from the PDP address to a TE, so that the TE constructs an IPv6 address based on the prefix and interface identifier.

Other aspects and features of the present invention will become apparent to those with ordinarily skill in the art upon review of the following descriptions of specific embodiments of the mobile communication device and method for IPv6 address acquisition by a mobile communication device.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof. Note that the 3GPP specifications described herein are used to teach the spirit of the invention, and the invention is not limited thereto.

Figure 1:
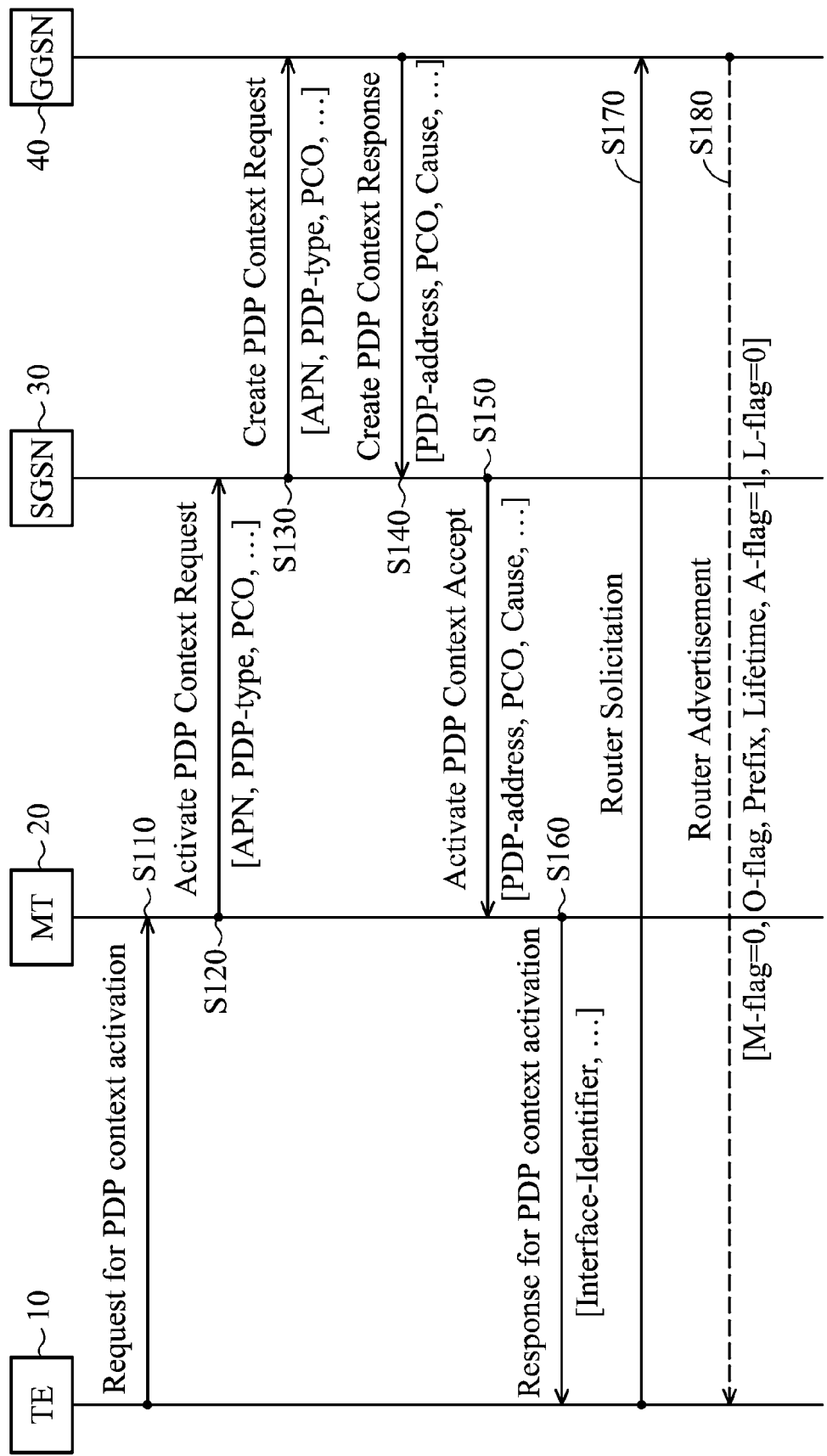
FIG. 1 is a message sequence chart illustrating a stateless address auto-configuration of an IPv6 address in a mobile communication system.
Figure 2:
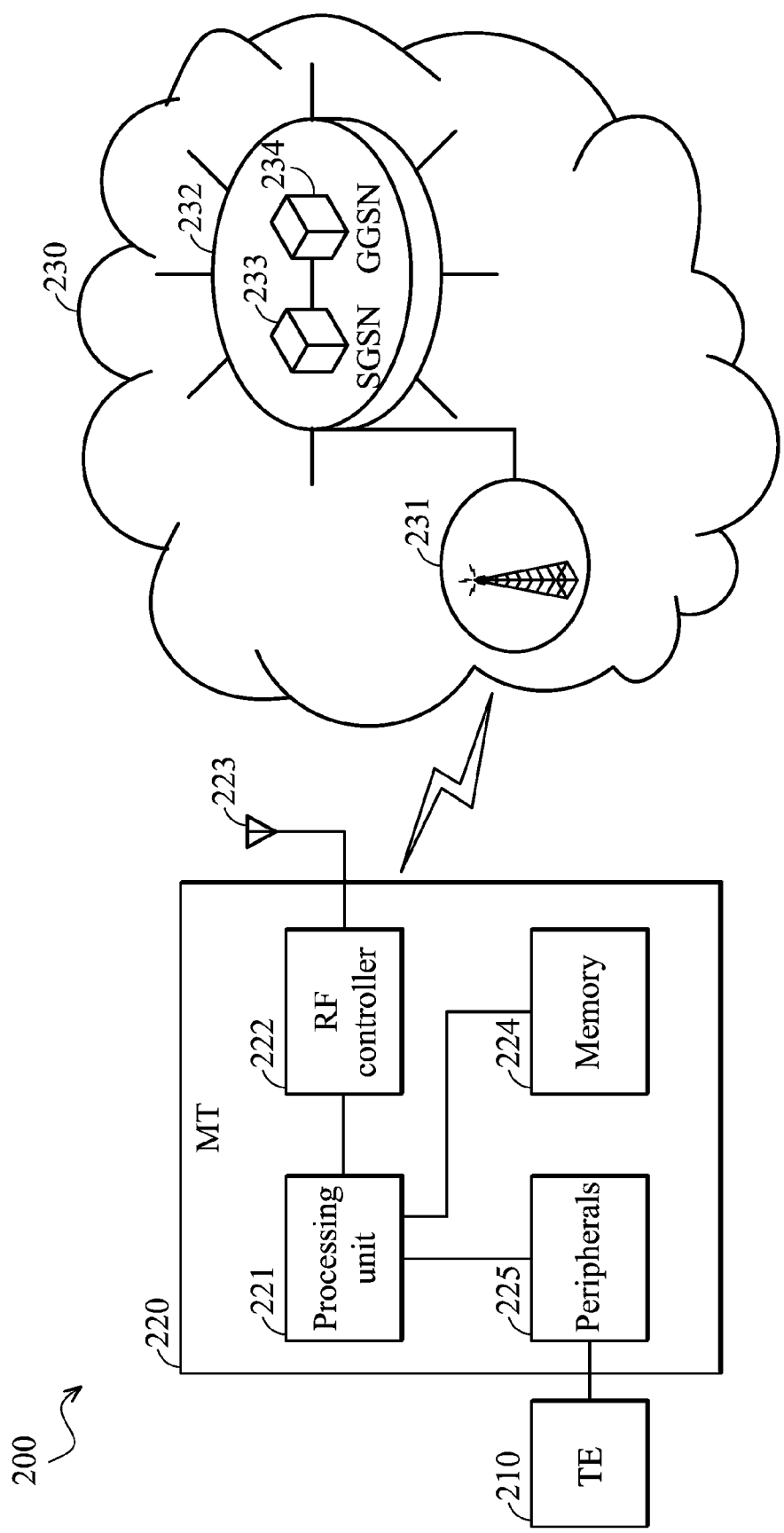
FIG. 2 is a block diagram of a mobile communication system according to an embodiment of the invention.

FIG. 2 is a block diagram of a mobile communication system according to an embodiment of the invention. The system 200 comprises the Terminal Equipment (TE) 210, the Mobile Terminal (MT) 220, and the service network 230, wherein the TE 210 may communicate with the service network 230 via the MT 220. The TE 210 may be a Personal Computer (PC), a laptop computer, a palmtop computer, a data card, or others, which provides a service platform for applications. The MT 220 may be a mobile communication device, such as a cellular phone, a Personal Digital Assistant (PDA), a smart phone, or others. Specifically, the MT 220 includes a processing unit 221, a Radio Frequency (RF) controller 222, an antenna 223, a memory device 224, and one or more peripherals 225. The RF controller 222 is coupled to the antenna 223 and transceives wireless signals from/to the service network 230 via the antenna 223. The peripherals 225 couple the MT 220 with the TE 210. The peripherals 225 may include a Universal Asynchronous Receiver/Transmitter (UART), a Universal Serial Bus (USB), Bluetooth, or other means for connecting the MT 220 with external devices, e.g. the TE 210. The memory device 224 stores a series of program codes implementing the method for IPv6 address acquisition of the invention and the mobile communication protocol utilized for the communications between the MT 220 and the service network 230, and also stores instruction sets conforming to the architecture of the processing unit 221. The processing unit 221 may be a general-purposed processor, or a Micro-Control Unit (MCU), or others, to execute the program codes stored in the memory device 224 and control the RF controller 222 and peripherals 225. Also, the processing unit 221 may comprise a plurality of processor logics to provide the method, as proposed in the invention, for IPv6 address acquisition by a mobile communication device. The memory device 224 may be a volatile memory, e.g. a Random Access Memory (RAM), or a non-volatile memory, e.g. a flash memory, Read-Only Memory (ROM), or hard disk, or any combination thereof Please note that, although the TE 210 and the MT 220 are shown to be two separate devices, they may be incorporated into one single device. For example, the TE 210 may be implemented as one or more software modules and incorporated into the MT 220, and the invention should not be limited thereto.

The service network 230 may be a Universal Mobile Telecommunications System (UMTS) network, which provides wireless connectivity of the Circuit-Switched (CS) and Packet-Switched (PS) services to the MT 220. The service network 230 further includes an access network (or called radio access network) 231 and a core network 232, wherein the access network 231 allows connectivity between the MT 220 and the core network 232 by providing the functionality of wireless transmissions and receptions to and from the MT 220 for the core network 232, and the core network 232 signals the required operation to the access network 231 for providing wireless services to the MT 220. The access network 231 may contain one or more base stations (or called NodeBs) and Radio Network Controllers (RNCs). Specifically, the core network 232 includes a Serving GPRS (General Packet Radio Services) Support Node (SGSN) 233 and a Gateway GPRS Support Node (GGSN) 234, wherein the SGSN 233 is the key control node for packet routing and transfer, mobility management (e.g., attach/detach and location management), session management, logical link management, and authentication and charging functions, etc., and the GGSN 234 is responsible for PDP addresses assignments and inter-working with external networks. Additionally, the service network 230 may further include other functional entities, such as a Home Location Register (HLR) (not shown) which is a central database storing user-related and subscription-related information, and the invention is not limited thereto.

Figure 3:
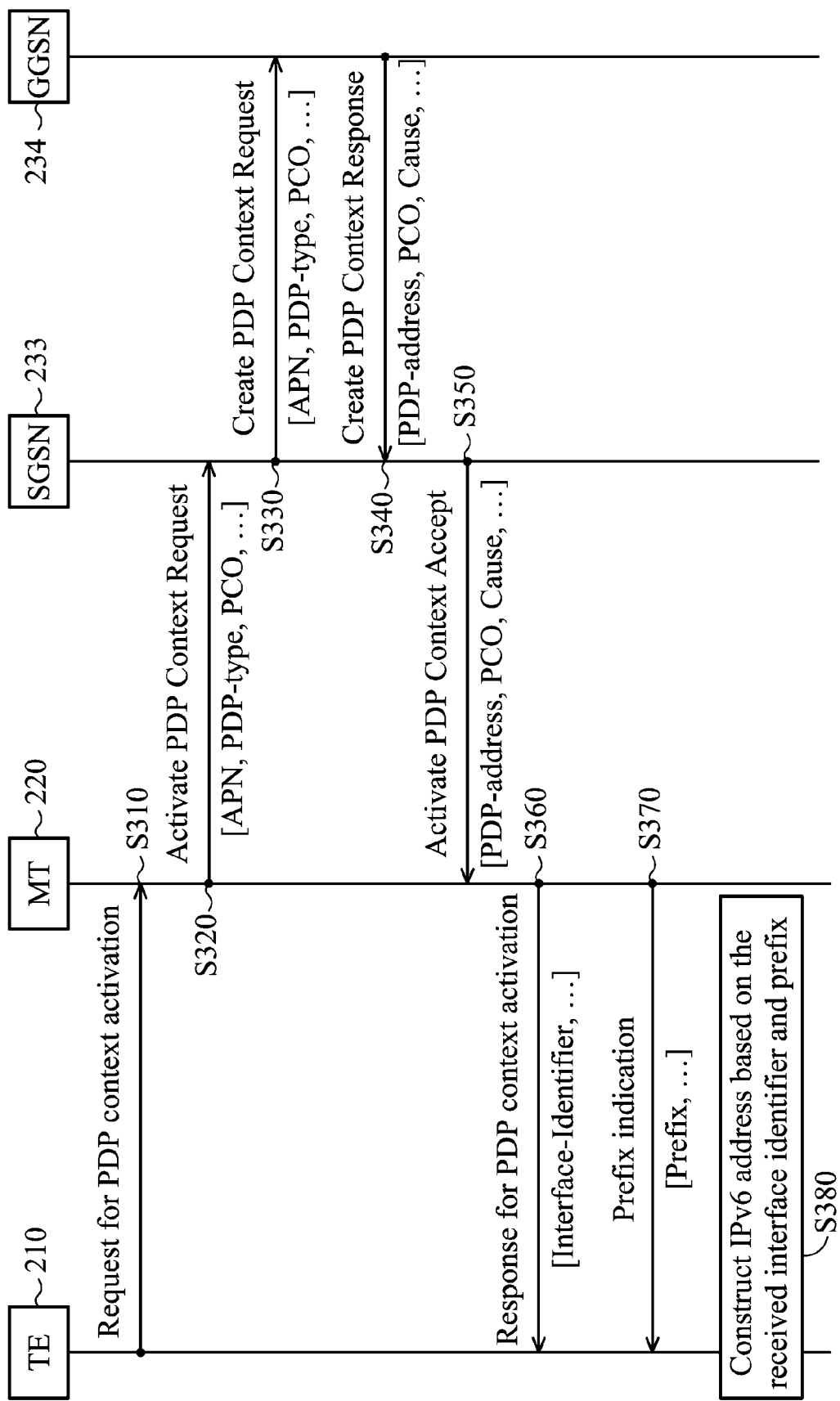
FIG. 3 is a message sequence chart illustrating a stateless address auto-configuration of an IPv6 address in a mobile communication system according to an embodiment of the invention.

FIG. 3 is a message sequence chart illustrating a stateless address auto-configuration of an IPv6 address in a mobile communication system according to an embodiment of the invention. As shown in FIG. 3, the TE 210 initiates an IPv6 interface-identifier negotiation by sending a request for PDP context activation to the MT 220 when it requires an IPv6 address for packet transceiving within the PS domain of the service network 230 and/or for packet transceiving on the Intranet or Internet Service Provider (ISP) (step S310). In a first embodiment, the request sent by the TE 210 may be implemented in a command in accordance with the Point-to-Point Protocol (PPP), such as the IPv6CP Configure-request. In a second embodiment, the request sent by the TE 210 may be implemented in an Attention (AT) command Application Programming Interface (API) in accordance with the 3GPP TS 27.007 specification, such as the AT+CGACT command. In a third embodiment, the request sent by the TE 210 may be implemented in a proprietary interface predefined between the TE 210 and the MT 220. In response to the received request from the TE 210, the MT 220 sends an Activate PDP Context Request message to the SGSN 233 (step S320). Specifically, the Activate PDP Context Request message may contain various parameters, such as the information concerning the requested Access Point Name (APN), PDP type, and Protocol Configuration Options (PCO), etc., each of which is contained in a corresponding Information Element (IE) in the Activate PDP Context Request message. The APN is a logical name referring to the external packet data network or a service that the subscriber wishes to connect to, and the TE 210 or the MT 220 may use the APN to select a reference point to a certain external network or to select a service. The PDP type is set to a value representing "IPv6" or "IPv4v6". The PCO may include negotiated Link Control Protocol (LCP) options such as negotiated Authentication Protocol as well as any authentication data previously stored in the MT 220. When receiving the Activate PDP Context Request message, the SGSN 233 further sends a Create PDP Context Request message with the unmodified parameters in the Activate PDP Context Request message to the GGSN 234 (step S330).

Subsequently, the GGSN 234 replies to the SGSN 233 with a Create PDP Context Response message which indicates an assigned PDP address (step S340). In addition to containing a PDP address IE for indicating the assigned PDP address, the Create PDP Context Response message may also contain the PCO IE which may comprise configuration data such as a list of Domain Name System (DNS) server IPv6 addresses, and a cause value for indicating the outcome of the host authentication and configuration. Next, the SGSN 233 forwards the PDP address to the MT 220 by sending an Activate PDP Context Accept message to the MT 220 (step S350). When receiving the Activate PDP Context Accept message, the MT 220 extracts an interface identifier from the PDP address and then indicates the interface identifier to the TE 210 via a response for PDP context activation (step S360). Also, the MT 220 extracts a prefix from the PDP address and then indicates the prefix to the TE 210 via a prefix indication (step S370). After that, the TE 210 constructs an IPv6 address based on the received interface identifier and prefix (step S380), and the procedure ends. Rather than the introduced steps S360 to S380, those skilled in the art may practice the MT 220 to construct the IPv6 address by extracting both the interface identifier and the prefix from the PDP address and indicate the IPv6 address to the TE 210 via an IPv6 indication. Note that, with violation of the specification 3GPP 29.061 defining that a Mobile Station (MS) issues a Router Solicitation (RS) message directly after the user plane establishment (PDP context activation) to trigger GGSN to send a Router Advertisement (RA) message immediately, the prefix is provided to the TE 210 by the MT 220 once an Activate PDP Context Accept message indicating a PDP address has been received, so that the TE 210 saves time required for performing a router discovery process to obtain the prefix and obtains PS services as early as possible.

Figure 4:
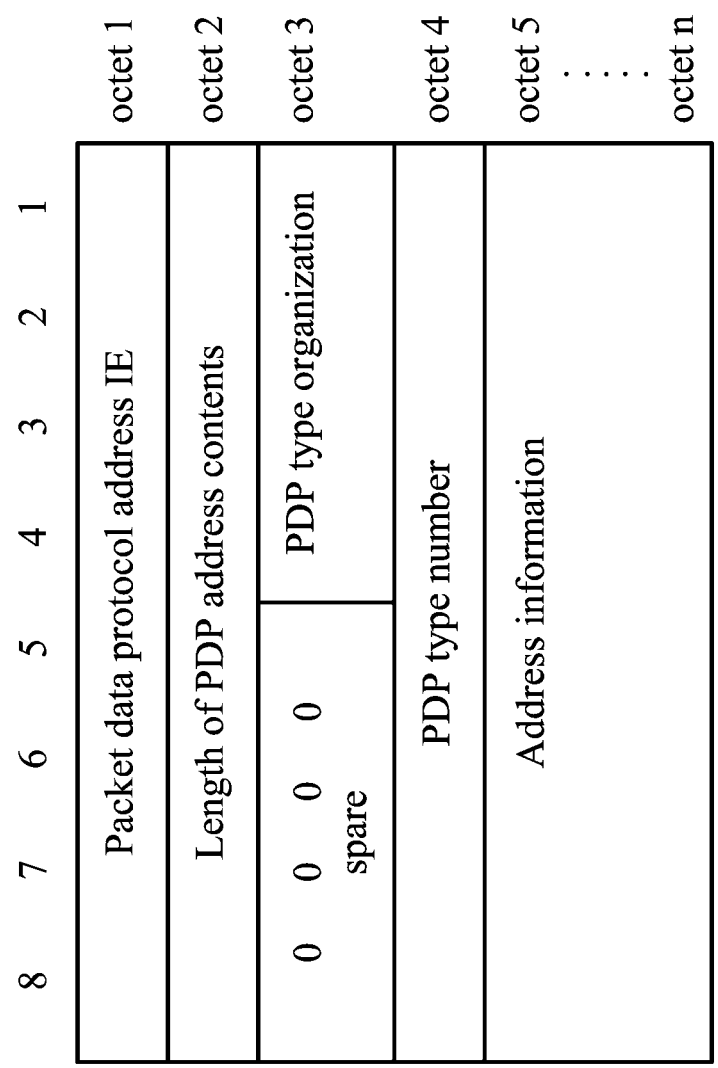
FIG. 4 is a schematic diagram illustrating the data structure of a PDP address Information Element (IE) according to the 3GPP TS 24.008 specification (v 8.14.0)

FIG. 4 is a schematic diagram illustrating the data structure of a PDP address IE according to the 3GPP TS 24.008 specification (v 8.14.0). To further clarify, the detailed operations with respect to the extraction of the prefix in the step S370 are given as follows. The MT 220 may determine whether the PDP address IE indicates a PDP type organization as the Internet Engineering Task Force (IETF), by checking the first to fourth digits in the octet 3 of the PDP address IE. The PDP type organization is the IETF if the bits 4, 3, 2, 1 in the octet 3 are coded as '0', '0', '0', '1', respectively. If the PDP address IE indicates a PDP type organization as the IETF, the MT 220 may determine whether the PDP address IE indicates a PDP type number with a value representing "IPv6" or "IPv4v6". The PDP type number corresponds to "IPv6" if the bits 8 to 1 in the octet 4 are coded as '0', '1', '0', '1', '0', '1', '1', '1', respectively, and the PDP type number corresponds to "IPv4v6" if the bits 8 to 1 in the octet 4 are coded as '1', '0', '0', '0', '1', '1', '0', '1', respectively. The MT 220 may extract the prefix from the address information indicated by the octet 5 to octet n in the PDP address IE. Specifically, the MT 220 extracts the octet 5 to octet 12 of the PDP address IE to be the prefix when the value of the PDP type number represents "IPv6", wherein the bit 8 of the octet 5 represents the most significant bit of the prefix and the bit 1 of the octet 12 represents the least significant bit of the prefix. Otherwise, the MT 220 extracts the octet 9 to octet 16 of the PDP address IE to be the prefix when the value of the PDP type number represents "IPv4v6", wherein the bit 8 of the octet 9 represents the most significant bit of the prefix and the bit 1 of the octet 16 represents the least significant bit of the prefix.

Similarly, the extraction of the interface identifier in the step S360 may be done by extracting the octet 13 to octet 20 of the PDP address IE when the value of the PDP type number represents "IPv6", wherein the bit 8 of the octet 13 represents the most significant bit of the interface identifier and the bit 1 of the octet 20 represents the least significant bit of the interface identifier. Otherwise, the MT 220 may extract the octet 17 to octet 24 of the PDP address IE to be the interface identifier when the value of the PDP type number represents "IPv4v6", wherein the bit 8 of the octet 17 represents the most significant bit of the interface identifier and the bit 1 of the octet 24 represents the least significant bit of the interface identifier.

Figure 5:
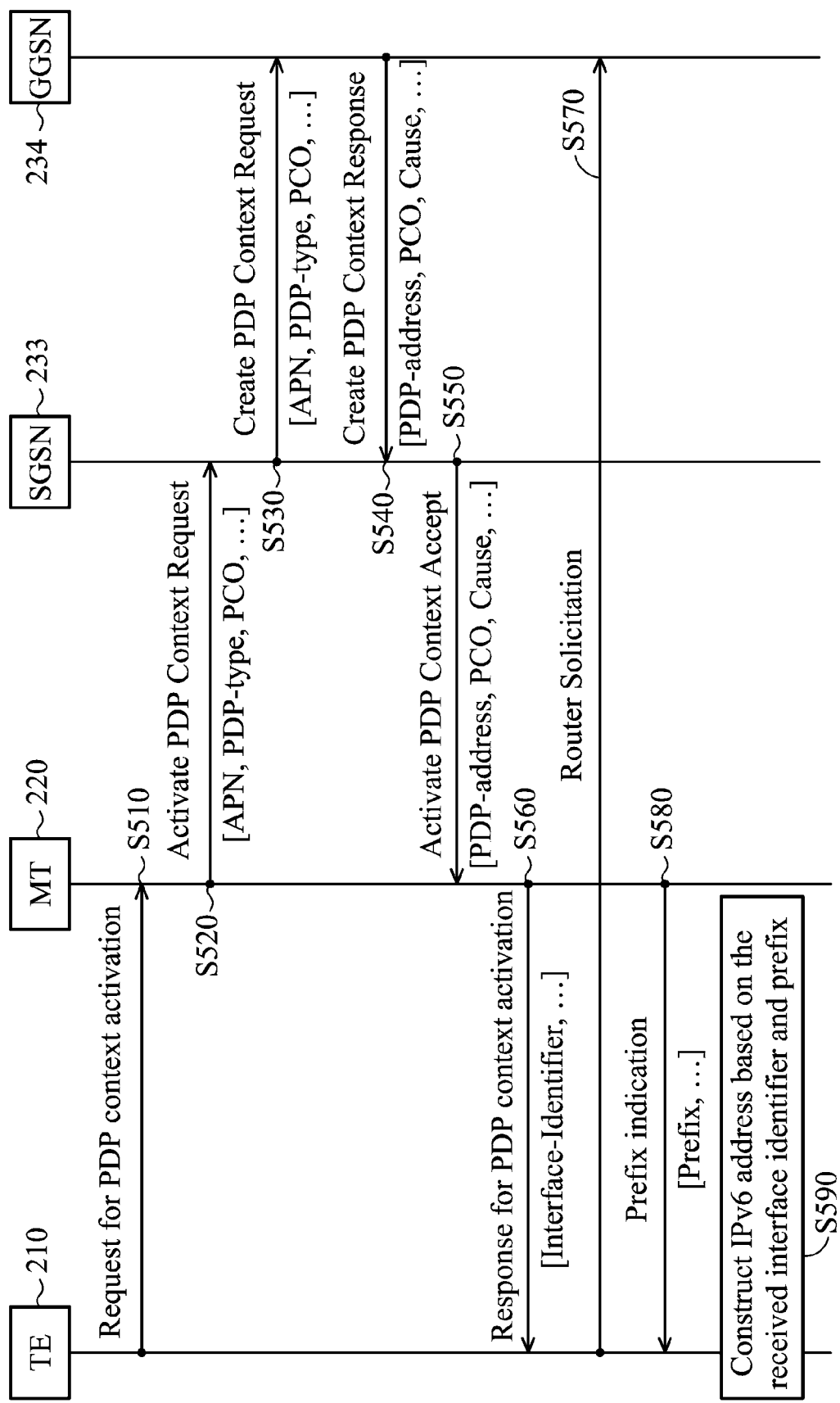
FIG. 5 is a message sequence chart illustrating a stateless address auto-configuration of an IPv6 address in a mobile communication system according to another embodiment of the invention.

FIG. 5 is a message sequence chart illustrating a stateless address auto-configuration of an IPv6 address in a mobile communication system according to another embodiment of the invention. As shown in FIG. 5, the IPv6 interface-identifier negotiation is initiated by the TE 210 with the MT 220, and the MT 220 forwards the request to the service network 230 and receives a response from the service network 230, thereby an interface identifier is extracted from a PDP address indicated by the response and then indicated to the TE 210 from the MT 220 (step S510~S560). Note that, the steps S510 to S560 of FIG. 5 are similar to the steps S310 to S360 of FIG. 3, and are not described in detail again here.

Subsequently, the TE 210 further constructs a link-local address according to the interface identifier and then proceeds to a router discovery process by sending an RS message to the GGSN 234 using the link-local address (step 570). After sending the RS message, the TE 210 waits for a predetermined time period to receive a reply (i.e., an RA message) from the GGSN 234. If, in this embodiment, no reply has been received from the GGSN 234 after the predetermined time period elapses, the MT 220 extracts a prefix from the PDP address indicated by the response (i.e., a Activate PDP Context Accept message) and then indicates the prefix to the TE 210 via a prefix indication (step S580). In some embodiments, a timer may be started to count the predetermined time period, and the step S580 is performed in response to the expiry of the timer. After that, the TE 210 constructs an IPv6 address based on the received interface identifier and prefix (step S590), and the procedure ends. To sum up, in order to prevent the TE 210 from waiting too long or waiting endlessly, the MT 220 monitors the reception of the reply from GGSN 234. When observing that the reply has not been received for a predetermined time period, the MT 220 extracts a prefix from previously received PDP address and indicates the prefix to the TE 210, thereby enabling the TE 210 to timely construct a global IPv6 address.

Alternatively, before performing the step S580, the TE 210 may resend the RS message when the predetermined time period has elapsed and again count the predetermined time period for waiting to receive an RA message from the GGSN 234. After a predetermined number of retries and receives no reply, the step S580 is performed. Yet in another embodiment, for each retry, the amount of the predetermined time period may be increased. For example, assume the amount of the predetermined time period to be x milliseconds, thus, the amount of the predetermined time period may be set to $x+m_1$ milliseconds for the first retry, x+m$_2$ milliseconds for the second retry, and x+m$_3$ milliseconds for the third retry, and so on, wherein m$_1$<m$_2$<m$_3$.

Regarding the step S310 of FIG. 3 and the step 510 of FIG. 5, the request for PDP context activation may be sent via an IPv6CP Configure Request message, an AT+CGACT command, or a proprietary interface predefined between the MT 220 and the TE 210. For example, the IPv6CP Configure Request message may be applied in a PPP dial-up scenario where the TE 210 and the MT 220 are disposed in two separate devices or incorporated into one single device. The AT+CGACT command may be applied in a Network Driver Interface Specification (NDIS) dial-up scenario where the TE 210 and the MT 220 are disposed in two separate devices or incorporated into one single device. The proprietary interface may be applied in the case where the TE 210 and the MT 220 are disposed in two separate devices or incorporated into one single device, such as a feature phone.

Regarding the step S370 of FIG. 3 and the step 580 of FIG. 5, the prefix indication may be carried out by a forged RA message, a proprietary AT command or a proprietary interface predetermined between the MT 220 and the TE 210, or a memory shared between the MT 220 and the TE 210. For example, the forged RA message may be applied in a PPP dial-up scenario where the TE 210 and the MT 220 may be disposed in two separate devices or incorporated into one single device. The proprietary AT command may be applied in an NDIS dial-up scenario where the TE 210 and the MT 220 may be disposed in two separate devices or incorporated into one single device. The proprietary interface may be applied in the case where the TE 210 and the MT 220 may be disposed in two separate devices or incorporated into one single device. The shared memory may be applied in the case where the TE 210 and the MT 220 are incorporated into one single device, such as a feature phone. Specifically, an allocated space in the shared memory may be used to store the prefix, and the value stored therein may be set to an initial value, e.g., 'ffff', to indicate that the prefix is not yet available, so that the TE 210 may periodically determine whether the stored value has been changed and obtain the prefix if so.

Figure 6:
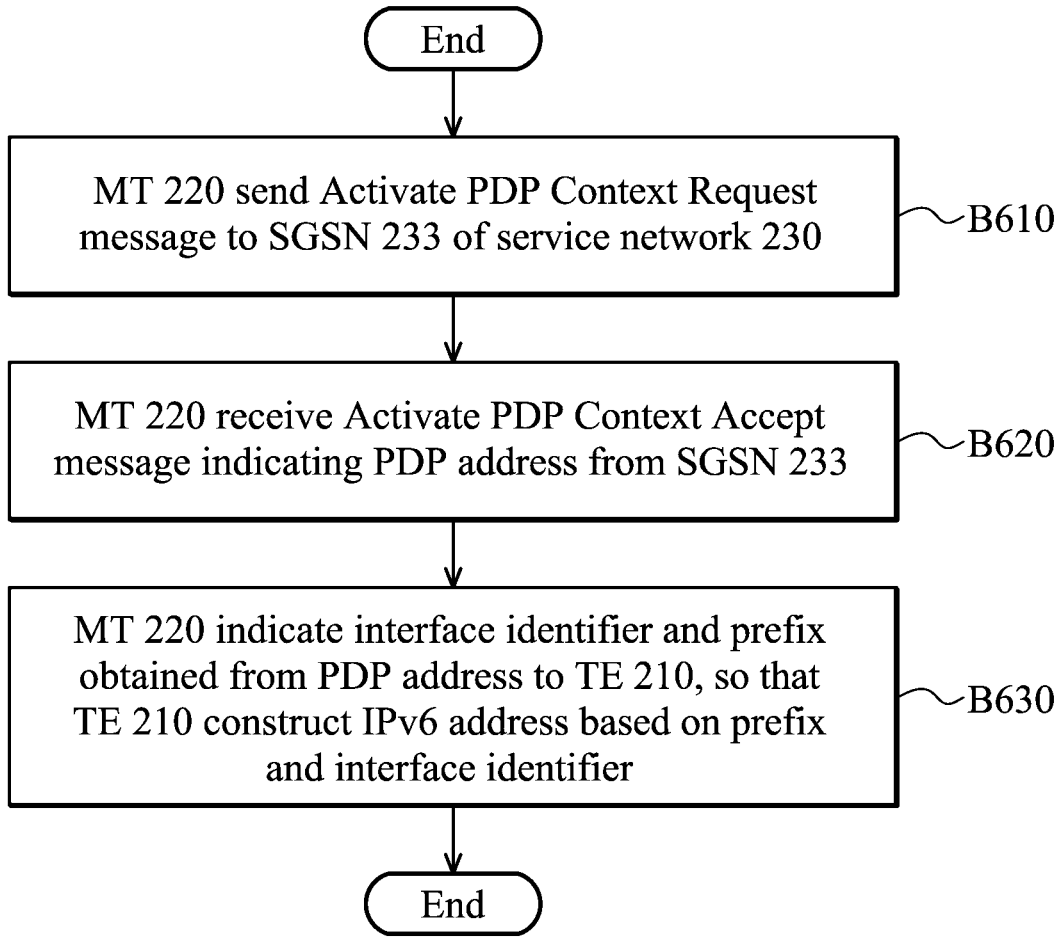
FIG. 6 is a flow chart illustrating the method for IPv6 address acquisition by a mobile communication device operating as a Mobile Terminal (MT) according to an embodiment of the invention.

FIG. 6 is a flow chart illustrating the method for IPv6 address acquisition by a mobile communication device operating as an MT according to an embodiment of the invention. Take the system 200 as an example. Starting at block B610, the MT 220 sends an Activate PDP Context Request message to the SGSN 233 of the service network 230. Once the Activate PDP Context Request message has been sent, the process proceeds to block B620. Please note that, the detailed description regarding the request for PDP context activation may be implemented by several examples with respect to the step S310 of FIG. 3 and the step 510 of FIG. 5 as described above, and is omitted here for brevity.

In block B620, the MT 220 receives an Activate PDP Context Accept message indicating a PDP address from the SGSN 233 of the service network 230. Next, in block B630, the MT 220 indicates an interface identifier and a prefix obtained from the PDP address to the TE 210, so that the TE 210 constructs an IPv6 address based on the prefix and interface identifier, and the IPv6 address acquisition is completed. Please note that, the detailed description regarding the prefix indication may be implemented by several examples with respect to the step S370 of FIG. 3 and the step 580 of FIG. 5 as described above, and is omitted here for brevity.

Figure 7:
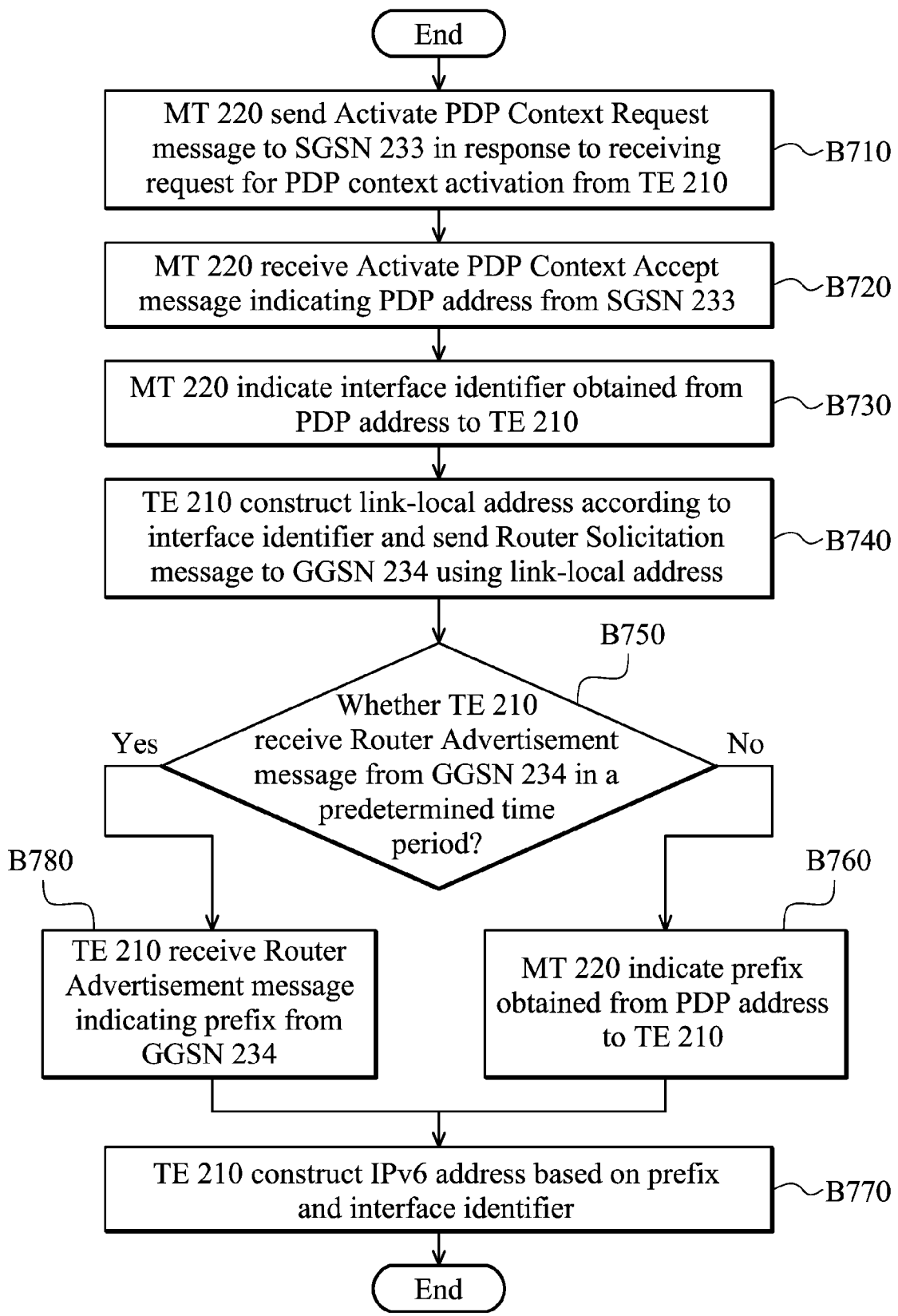
FIG. 7 is a flow chart further illustrating the method for IPv6 address acquisition by a mobile communication device operating as an MT according to another embodiment of the invention.

FIG. 7 is a flow chart further illustrating the method for IPv6 address acquisition by a mobile communication device operating as an MT according to another embodiment of the invention. Starting at block B710, the MT 220 sends an Activate PDP Context Request message to the SGSN 233 of the service network 230 when receiving a request for PDP context activation from the TE 210. Once the Activate PDP Context Request message has been sent, the process proceeds to block B720, where the MT 220 receives an Activate PDP Context Accept message indicating a PDP address from the SGSN 233 of the service network 230. Subsequently, the process proceeds to block B730, where the MT 220 indicates an interface identifier obtained from the PDP address to the TE 210. In block B740, the TE 210 constructs a link-local address according to the interface identifier and sends an RS message to the GGSN 234 of the service network 230 using the link-local address.

Next, in block B750, the MT 220 determines whether an RA message has been received from the GGSN 234 of the service network 230 in a predetermined time period. If not, the process proceeds to block B760, where the MT 220 indicates a prefix obtained from the PDP address to the TE 210. Consequently, in block B770, the TE 210 constructs an IPv6 address based on the prefix and interface identifier, and the IPv6 address acquisition is completed.

Subsequent to block B750, if so, the process proceeds to block B780, where the TE 210 receives an RA message indicating the prefix from the GGSN 234 of the service network 230, and then the process proceeds to block 770 to complete the IPv6 address acquisition.

Note that, the criterion of the determination process in block B750 may be alternatively configured to determine whether the RS message has been resent for a predetermined number of times, wherein the amount of waiting time period between two retries may be increased as described above with respect to the alternative of the step S580 in FIG. 5.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A mobile communication device, operating as a Mobile Terminal (MT), comprising:
   a Radio Frequency (RF) controller, coupled to an antenna, for performing wireless transceiving from and to a service network via the antenna; and
   a processor for sending an Activate PDP (Packet Data Protocol) Context Request message to the service network via the RF controller, receiving an Activate PDP Context Accept message, which comprises a PDP address and does not comprise a Router Advertisement message, from the service network via the RF controller, and retrieving an interface identifier and a prefix from the PDP address and indicating the interface identifier and the prefix to a Terminal Equipment (TE).

2. The mobile communication device of claim 1, wherein the interface identifier and the prefix are indicated to the TE separately.

3. The mobile communication device of claim 1, wherein the prefix is indicated to the TE when no Router Advertisement message has been received from the service network for a predetermined time period from sending of a Router Solicitation message.

4. The mobile communication device of claim 1, wherein the prefix is indicated to the TE when no Router Advertisement message has been received from the service network after a predetermined number of retries for sending Router Solicitation messages.

5. The mobile communication device of claim 1, wherein the TE is a software module being executed by the processor of the mobile communication device.

6. The mobile communication device of claim 1, wherein the TE is disposed in an external electronic device.

7. The mobile communication device of claim 1, wherein the prefix is indicated to the TE via a forged Router Advertisement message, a proprietary AT command or a proprietary interface predetermined between the mobile communication device and the TE, or a memory shared between the mobile communication device and the TE.

8. The mobile communication device of claim 1, wherein the Activate PDP Context Accept message comprises a PDP address Information Element (IE) for indicating the PDP address, and the prefix is obtained by determining that the PDP address IE indicates a PDP type organization as the Internet Engineering Task Force (IETF) and indicates a PDP type number with a value representing "IPv6" or "IPv4v6".

9. The mobile communication device of claim 8, wherein the prefix is obtained by further extracting octet 5 to octet 12 of the PDP address IE when the value of the PDP type number represents "IPv6", or extracting octet 9 to octet 16 of the PDP address IE when the value of the PDP type number represents "IPv4v6".

10. A method for IPv6 address acquisition by a mobile communication device operating as a Mobile Terminal (MT), comprising:
    sending an Activate PDP (Packet Data Protocol) Context Request message to a service network;
    receiving an Activate PDP Context Accept message, which comprises a PDP address and does not comprise a Router Advertisement message, from the service network; and
    retrieving an interface identifier and a prefix from the PDP address and indicating the interface identifier and the prefix to a Terminal Equipment (TE).

11. The method of claim 10, wherein the interface identifier and the prefix are indicated to the TE separately.

12. The method of claim 10, wherein the prefix is indicated to the TE when no Router Advertisement message has been received from the service network for a predetermined time period from sending of a Router Solicitation message.

13. The method of claim 10, wherein the prefix is indicated to the TE when no Router Advertisement message has been received from the service network after a predetermined number of retries of sending Router Solicitation messages.

14. The method of claim 10, wherein the TE is a software module being executed by a processor of the mobile communication device.

15. The method of claim 10, wherein the TE is disposed in an external electronic device.

16. The method of claim 10, wherein the prefix is indicated to the TE via a forged Router Advertisement message, a proprietary AT command or a proprietary interface predetermined between the mobile communication device and the TE, or a memory shared between the mobile communication device and the TE.

17. The method of claim 10, wherein the Activate PDP Context Accept message comprises a PDP address Information Element (IE) for indicating the PDP address, and the prefix is obtained by determining that the PDP address IE indicates a PDP type organization as the Internet Engineering Task Force (IETF) and indicates a PDP type number with a value representing "IPv6" or "IPv4v6".

18. The method of claim 17, wherein the prefix is obtained by further extracting octet 5 to octet 12 of the PDP address IE when the value of the PDP type number represents "IPv6", or extracting octet 9 to octet 16 of the PDP address IE when the value of the PDP type number represents "IPv4v6".

19. A method for IPv6 address acquisition by a mobile communication device, comprising:
    sending an Activate PDP (Packet Data Protocol) Context Request message to a service network;
    receiving an Activate PDP Context Accept message, which comprises a PDP address and does not comprise a Router Advertisement message, from the service network;
    retrieving an interface identifier and a prefix from the PDP address; and
    constructing an IPv6 address based on the interface identifier and the prefix.

20. A mobile communication device, comprising:
    a Radio Frequency (RF) controller, coupled to an antenna, for performing wireless transceiving from and to a service network via the antenna; and
    a processor for sending an Activate PDP (Packet Data Protocol) Context Request message to the service network via the RF controller, receiving an Activate PDP Context Accept message, which comprises a PDP address and does not comprise a Router Advertisement message, from the service network via the RF controller, retrieving an interface identifier and a prefix from the PDP address, and constructing an IPv6 address based on the interface identifier and the prefix.

* * * * *